Paige & Clary.
Grain Drill.
Nº 18,765. Patented Dec. 1, 1867.

UNITED STATES PATENT OFFICE.

DAVID O. PAIGE AND JOHN CLARY, OF DAYTON, OHIO.

IMPROVEMENT IN SEEDING-MACHINES.

Specification forming part of Letters Patent No. 18,765, dated December 1, 1857.

*To all whom it may concern:*

Be it known that we, DAVID O. PAIGE and JOHN CLARY, of Dayton, in the county of Montgomery and State of Ohio, have invented a new and useful Improvement in Seeding-Machines; and we do hereby declare that the following is a full, clear, and exact description of the same, reference being had to the annexed drawings, making a part of this specification, in which—

Figure 1:
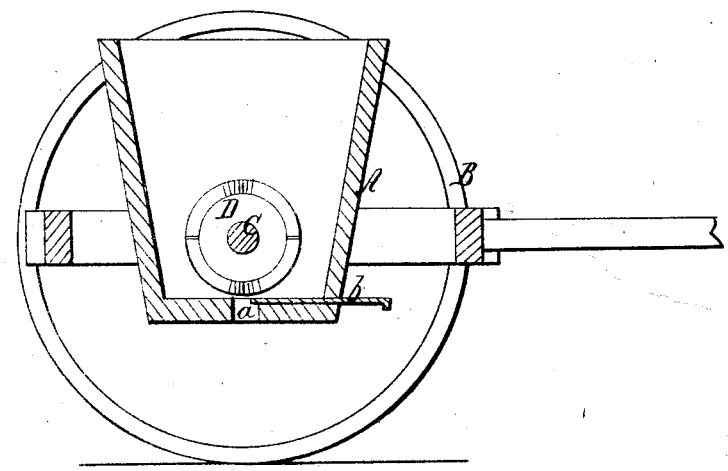
Figure 2:
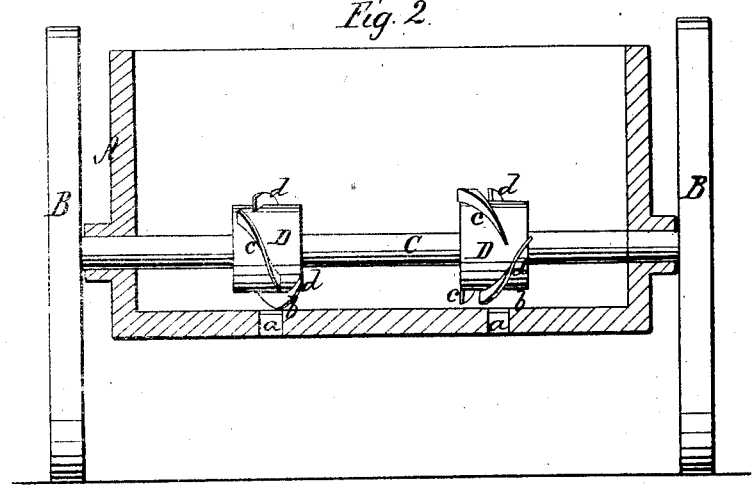

Figure 1 is a transverse central section of seed-box of a seeding-machine showing our improvement. Fig. 2 is a longitudinal central section of same.

Similar letters of reference indicate corresponding parts in the two figures.

The object of this invention is to prevent the discharge-orifices of the seed-box from choking or clogging, and thereby effect a free and even discharge of the seed therefrom. The object is attained by having right and left spiral flanges placed on cylinders within the hopper and directly over the discharge-orifices, said flanges being so arranged that as the cylinders rotate the seed directly over the orifices will be moved first to the right and then to the left, and by being thus moved or agitated effecting the desired result.

To enable those skilled in the art to fully understand and construct our invention, we will proceed to describe it.

A represents a seed-box, which is constructed and mounted upon wheels B in the usual way, each hole being provided with a slide, $b$, so that it may be contracted when desired, and on the axle C cylinders D are placed, one over each hole. Any number of holes $a$ and cylinders D may be used. On each cylinder D a series of spiral flanges, $c\ d$, are placed. These flanges are attached to the cylinders in reverse positions, the flanges $c$ being what may be termed "right-hand" flanges, and the flanges $d$ "left-hand" ones. (See Fig. 2.) The ends of the flanges do not touch or intersect each other, spaces being allowed between them. The flanges may have a greater or less pitch, as desired, and be of any proper width. Their outer edges do not quite touch the bottom of the seed-box.

The seed-box is supplied with the seed to be planted, and as the implement is drawn along the cylinders D are of course rotated, and the spiral flanges $c\ d$, owing to their reversed position on each cylinder, will move the seed first to the right and then to the left, keeping it constantly agitated and directly over the holes $a$, thereby preventing the seed from choking or clogging up the holes, and insuring a free and even discharge of seed therefrom.

We are aware that pins and flanges have been attached to rotating drums or cylinders for the purpose of agitating the seed in the seed-boxes of seeding-machines and preventing the choking and clogging of the same; but we are not aware that spiral flanges placed in reverse positions on drums or cylinders, so as to give a reciprocating or vibratory movement to the seed, and thereby effecting a greater agitation than usual, have been used. We do not claim, therefore, broadly and irrespective of the arrangement herein shown, the employment or use of spiral flanges or pins placed in spiral rows on drums or cylinders, for they have been previously used; but,

Having thus described our invention, what we claim as new, and desire to secure by Letters Patent, is—

The spiral flanges $c\ d$, placed in reverse positions on the rotating cylinders D D within the hopper A, substantially as and for the purpose set forth.

DAVID O. PAIGE.
JOHN CLARY.

Witnesses:
M. I. BUTTERFIELD,
S. M. SULLIVAN.